United States Patent [19]

Leonard

[11] 4,355,506

[45] Oct. 26, 1982

[54] PUMP-MOTOR POWER LIMITER AND PRESSURE RELIEF

[76] Inventor: Willie B. Leonard, 5902 Royalton, Houston, Tex. 77081

[21] Appl. No.: 33,036

[22] Filed: Apr. 25, 1979

Related U.S. Application Data

[63] Continuation-in-part of Ser. No. 828,045, Aug. 26, 1977, Pat. No. 4,227,440, which is a continuation-in-part of Ser. No. 772,560, Feb. 28, 1977, abandoned, which is a continuation-in-part of Ser. No. 622,760, Oct. 15, 1975, Pat. No. 4,094,229, which is a continuation-in-part of Ser. No. 521,036, Nov. 5, 1974, Pat. No. 4,046,059, which is a continuation-in-part of Ser. No. 489,829, Jul. 18, 1974, Pat. No. 3,988,966.

[51] Int. Cl.³ .............................................. F16H 39/46

[52] U.S. Cl. ........................................ 60/389; 60/392; 60/443; 60/452; 60/492

[58] Field of Search ................. 60/443, 445, 468, 486, 60/487, 490, 491, 452, 389, 391, 392, 492; 91/506; 417/426, 428, 212

[56] References Cited

U.S. PATENT DOCUMENTS

| | | | |
|---|---|---|---|
| 2,896,411 | 7/1959 | Bowers et al. | 60/399 |
| 3,003,309 | 10/1961 | Bowers et al. | 60/431 |
| 3,164,960 | 1/1965 | Weisenbach et al. | 60/389 X |
| 3,166,891 | 1/1965 | Weisenbach | 60/392 X |
| 3,222,997 | 12/1965 | Blatt et al. | 91/448 X |
| 3,238,723 | 3/1966 | Young | 60/389 X |
| 3,606,755 | 9/1971 | Connett | 60/446 |
| 3,650,108 | 3/1972 | Issac | 60/444 X |
| 3,744,243 | 7/1973 | Faisandier | 60/431 |
| 3,862,643 | 1/1975 | Dezelan et al. | 137/625.66 |
| 3,898,807 | 8/1975 | Habiger | 60/392 X |
| 3,918,259 | 11/1975 | Habiger et al. | 60/452 X |
| 3,988,966 | 11/1976 | Leonard | 91/388 |
| 3,995,831 | 12/1976 | Spanski et al. | 60/391 X |
| 4,046,059 | 9/1977 | Leonard | 91/388 |
| 4,094,229 | 6/1978 | Leonard | 91/506 |
| 4,137,825 | 2/1979 | Leonard | 91/461 X |
| 4,152,971 | 5/1979 | Leonard | 91/388 |
| 4,227,440 | 10/1980 | Leonard | 91/388 X |

OTHER PUBLICATIONS

Moog Catalog No. 625.
Sundstrand Bulletin 9565, Rev. A.
Hydreco Service Manual S50-888.
Hydreco Bulletin, 9-000.1.
Hydreco Application Engineering Manual 9-002.13A.

*Primary Examiner*—Irwin C. Cohen
*Attorney, Agent, or Firm*—Murray Robinson; Ned L. Conley; David Alan Rose

[57] ABSTRACT

Pump-motor hydraulic power system incorporation means to limit the power transmitted and the pressure in the transmission lines. High pressure line is connected to one end of a servo motor comprising a cylinder with a spring loaded piston therein. When the pump pressure increases above a certain amount it overcomes the spring and moves the piston and the piston rod to a blocking position, acting to limit movement of the three way control valve or to move the three way control valve back if it already exceeds the limit imposed by the power limiter's piston rod.

20 Claims, 6 Drawing Figures

PUMP-MOTOR POWER LIMITER AND PRESSURE RELIEF

CROSS-REFERENCES TO RELATED APPLICATIONS

This application is a continuation-in-part of prior U.S. patent application Ser. No. 828,045 filed Aug. 26, 1977, now U.S. Pat. No. 4,227,440 issued Oct. 14, 1980, which was a continuation-in-part of U.S. patent application Ser. No. 772,560 filed Feb. 28, 1977, now abandoned which was a continuation-in-part of U.S. patent application Ser. No. 622,760 filed Oct. 15, 1975, now U.S. Pat. No. 4,094,229 issued June 13, 1978, which was a continuation-in-part of U.S. patent application Ser. No. 521,036 filed Nov. 5, 1974, now U.S. Pat. No. 4,046,059 issued Sept. 6, 1977, which was a continuation-in-part of U.S. patent application Ser. No. 489,829, filed July 18, 1974, now U.S. Pat. No. 3,988,966, issued Nov. 2, 1976.

U.S. application Ser. No. 720,410, filed Sept. 3, 1976, now U.S. Pat. No. 4,137,825 issued Feb. 6, 1979, is a division of U.S. application Ser. No. 489,829, (patent 3,988,966).

U.S. application Ser. No. 931,322 filed Aug. 7, 1978, now U.S. Pat. No. 4,254,689 issued Mar. 10, 1981, is a further division of U.S. application Ser. No. 489,829, (patent 3,988,966).

U.S. application Ser. No. 720,420 filed Sept. 3, 1976, now U.S. Pat. No. 4,152,971 issued May 8, 1979, is a division of U.S. application Ser. No. 521,036 (patent 4,046,059).

U.S. application Ser. No. 872,826 filed Jan. 27, 1978, now U.S. Pat. No. 4,265,331 issued May 5, 1981, is a division of U.S. application Ser. No. 622,760 (U.S. Pat. No. 4,094,229).

U.S. patent application Ser. No. 962,858 filed Nov. 22, 1978, is a division of U.S. application Ser. No. 772,560, filed Feb. 28, 1977.

U.S. patent application Ser. No. 27,668 filed Apr. 6, 1979, is a further division of U.S. patent application Ser. No. 772,560 filed Feb. 28, 1977, now abandoned.

The benefit of the filing dates of the above mentioned U.S. patent applications is claimed pursuant to 35 U.S.C. 120.

The disclosure of U.S. Pat. No. 4,094,229 is incorporated herein by reference.

The disclosures of U.S. patent applications Ser. No. 828,045 filed Aug. 26, 1977, now U.S. Pat. No. 4,227,440 issued Oct. 14, 1980, and Ser. No. 962,858 filed Nov. 22, 1978, allowed circa Apr. 1, 1981, (base issue fee paid circa June 22, 1981) are also incorporated herein by reference.

BACKGROUND OF THE INVENTION

This invention relates to pump-motor hydraulic power transmission systems, and more particularly to fluidic control of such systems incorporating means to limit the power transmitted and the pressure in the transmission lines.

Pump-motor power transmission systems are known, as discussed in the aforementioned U.S. Pat. No. 4,094,229. As there disclosed, a swash plate controlled pump may supply hydraulic fluid (e.g. a light oil) at variable pressure and rate to a swash plate controlled hydraulic motor. The angular position of the pump swash plate (or the motor swashplate or both) is varied by hydraulic servo motor means, which is controlled by a fluidic repeater. Such repeater may, for example, include a control valve or transmitter varying the fluid pressure in one or more lines leading to a responder comprising a spool valve which moves when there is a difference in the pressures on its ends. Such movement may control fluid supply to servo-motor means, movement of the servomotor means (e.g. a pair of oppositely acting servo motors) controlling the swash plate position. Feedback means responsive to movement of the swash plate may restore the spool valve to a neutral position corresponding to no further servomotor movement, and further feedback responsive to movement of the responder may change the pressure differential across the ends of the responder to restore it to balance in a position where its motion is equal or proportional to that of the transmitter.

It is an object of the invention to incorporate in the foregoing system means to reduce or limit the rate of fluid flow from the hydraulic pump to the hydraulic motor when the pump pressure gets above a certain value, e.g. when the torque requirements of the motor become high, thereby to limit the power load on the pump and its associated drive means (e.g. diesel or gasoline engine).

It has been previously disclosed to provide a power limiting arrangement in a pump-motor hydraulic power transmission system with a somewhat different control system. See the brochure entitled "DYNAPOWER (R) Hydrostatic Transmission Systems, Models 110 and 120 SERVICE MANUAL and Trouble Shooting Guide" by HYDRECO (R) A Unit of General Signal, bearing the notation "S 50-888.0 Price $3.00 11/73". This power limiter requires an auxiliary valve in series with the pressure fluid supply to the three way valve controlling the swash plate angle adjusting servo motor.

SUMMARY OF THE INVENTION

According to the invention, the pump high pressure line is connected to one end of a servo motor comprising a cylinder with a spring loaded piston therein. When the pump pressure increases above a certain amount it overcomes the spring and moves the piston and the piston rod moves to a blocking position, acting indirectly or directly to limit movement of the three way control valve or to move the three way control valve back if it already exceeds the limit imposed by the power limiter's piston rod. Two oppositely directed power limiters may be employed, connected to different ones of the pump's transmission lines that connect to the motor, so that one or the other of the power limiters will be connected to the high pressure transmission line whether the pump is pumping fluid in one direction or the other.

The power limiter of the invention has the further advantage of enabling a simple pressure limiting arrangement to be included in the system, and such a pressure limiting arrangement for limiting pressures in the transmission lines is disclosed. The system disclosed also includes ancillary means for very fine (creep) adjustment of the transmitter, and emergency means for quickly bringing the pump swash plate to neutral or zero output position. The system is disclosed in combination with a particular form of four wheel drive truck. Preferably the follow-up control system of applicant's prior patents is employed for positioning the three way control valve, such operator means including a responder (pilot servo motor) directly connected to the three way control valve and a transmitter (pilot valve)

which may be remote therefrom. The power limiter may be applied to either or both ends of the responder-three way control valve combination since they move as a unit. Preferably the power limiting piston rod is located so as to act directly on the responder, rather than on the three way control valve, since the force required to restrain or move the responder (considered by itself) is much greater than that required to move the three way control valve (considered by itself); acting directly on the responder avoids transmitting such force through the linkage between the control valve and responder.

BRIEF DESCRIPTION OF THE DRAWINGS

For a detailed description of the invention reference will be made to the accompanying scale drawings wherein the conventions of the U.S. Patent and Trademark Office for patent cases are employed to designate materials and wherein:

FIG. 4 is a schematic view of the apparatus shown in FIGS. 1 and 2 further incorporating swash plate control of the motor as per FIG. 1A tied to the motor control in accordance with a modification of the invention.

The materials are preferably all steel except for the O-ring seals which are elastomeric.

DESCRIPTION OF PREFERRED EMBODIMENT

Transmitter

Figure 1:
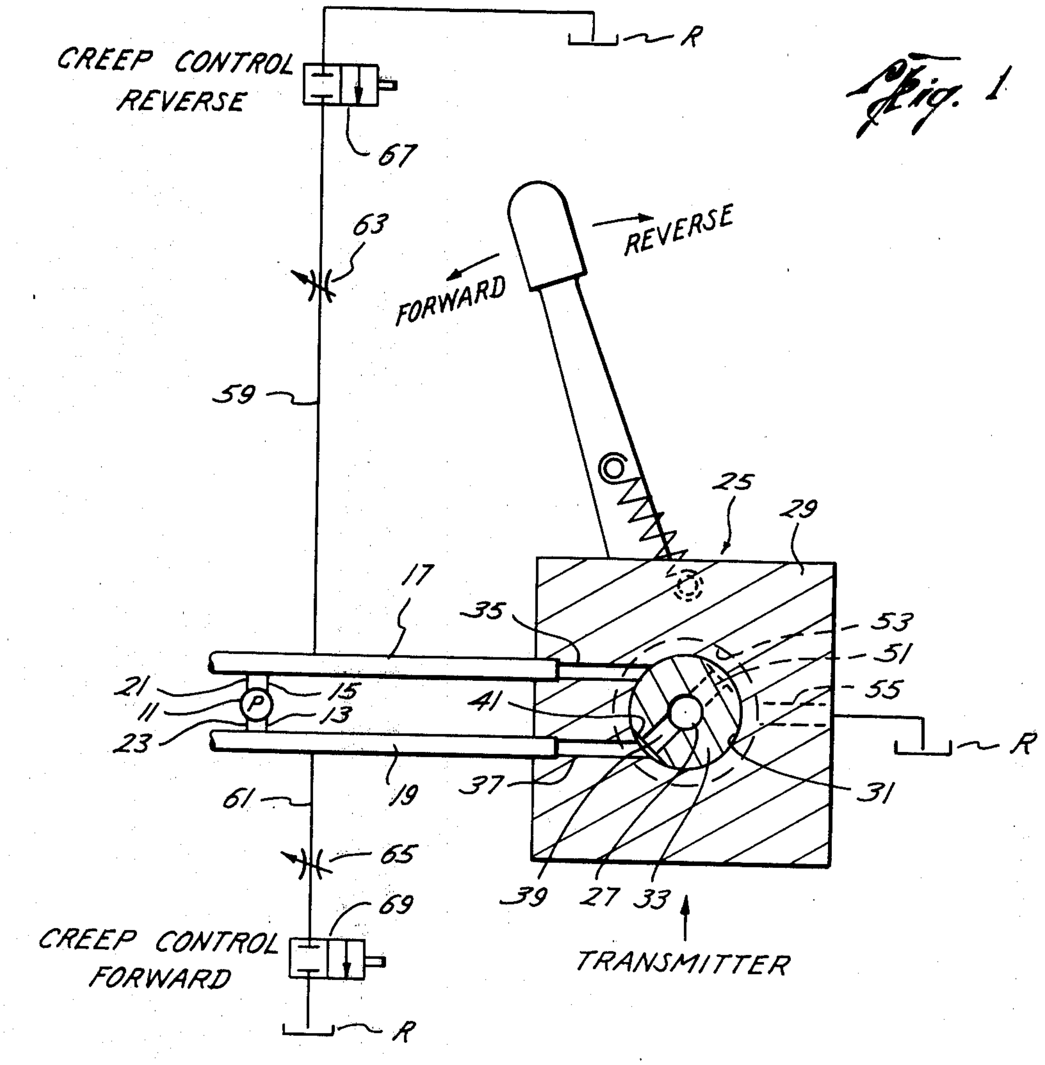
FIGS. 1 and 2 are partly schematic drawings showing a system incorporating the invention, certain elements of the system being shown in cross-section.

Referring now to FIG. 1 there is shown a hydraulic pump 11 connected through two pipes 13, 15 to two lines 17, 19. Pipes 13, 15 include flow restrictors 21, 23. Lines 17, 19 are connected to transmitter valve 25 through which each of the lines may be vented to a passage 27 leading ultimately (as described hereinafter) to a reservoir to which the intake of pump 11 is connected.

Figure 1A:
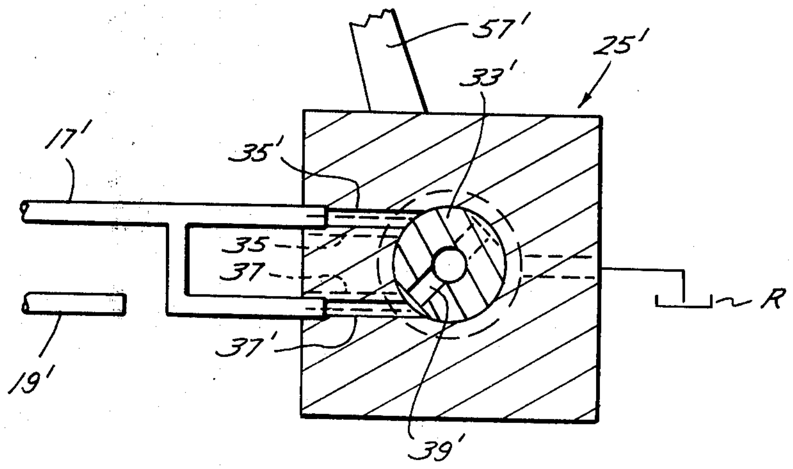
FIG. 1A shows a modification of the portion of the system shown in FIG. 1.
Figure 1B:
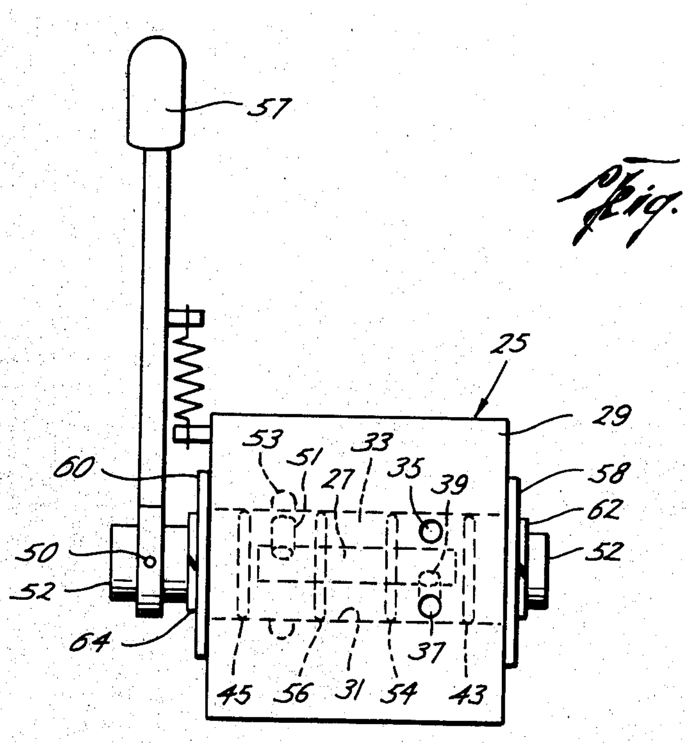
FIG. 1B is an elevation of the portion of the apparatus shown in FIG. 1.

Transmitter valve 25 includes a body 29 having a cylindrical cavity 31 within which is rotatably disposed a cylindrical core 33. Transverse ports 35, 37, connected to lines 17, 19, lead to cavity 31. Core 33 has a radial port 39 leading from a flat 41 on the outer periphery of the core to axial passage 27. The ends of core 33 on the outer periphery of the core as rotatably sealed to body 29 by O-rings 43, 45 in the manner illustrated in FIG. 1B, similar to the construction shown in FIG. 49 of the aforementioned U.S. Pat. No. 4,094,229. A further radial passage 51 extends in core 33 from axial passage 27, at a point axially displaced from passages 35, 37, to a circumferential groove 53 in body 29, the groove connecting with a radial passage 55 leading to the reservoir R of pump 11. Further in the manner illustrated in FIG. 1B further O-rings 54, 56, seal between body 29 and core 33, and separate passages 35, 37 and radial passage 39 from passage 55, groove 53 and radial passage 51.

Flat 41 is wider than the diameters of passages 35, 37. According to the azimuthal position of core 33 relative to the block, at least one or the other of passage 35, 37 is blocked off, while the other may be blocked off or open to varying extents, thereby to vent the passage to the reservoir. The azimuthal position of core 33 relative to body 29 is set by means of handle 57 connected by pin 50 to shaft 52 to which core 33 is affixed. End plates 58, 60 and snap rings 62, 64 keep the core in the body of the transmitter valve.

Lines 17 and 19 can also be vented through pipes 59, 61, the flow through which is controlled by finger adjustment screw valves 63, 65, for fine control or creep movement of the receiver connected to the transmitter. Manually set valves 67, 69 determine which, if either, of pipes 59, 61 may be vented to the reservoir, the latter being indicated schematically at R, R.

It will be noted that whereas core 33 requires less than 360 degrees motion, in fact less than one quarter turn (90 degrees) to move from full open to full closed position, valves 63, 65 require over 360 degrees motion, in fact several revolutions to move over the full range between full open and full closed position.

Responder

Figure 2:
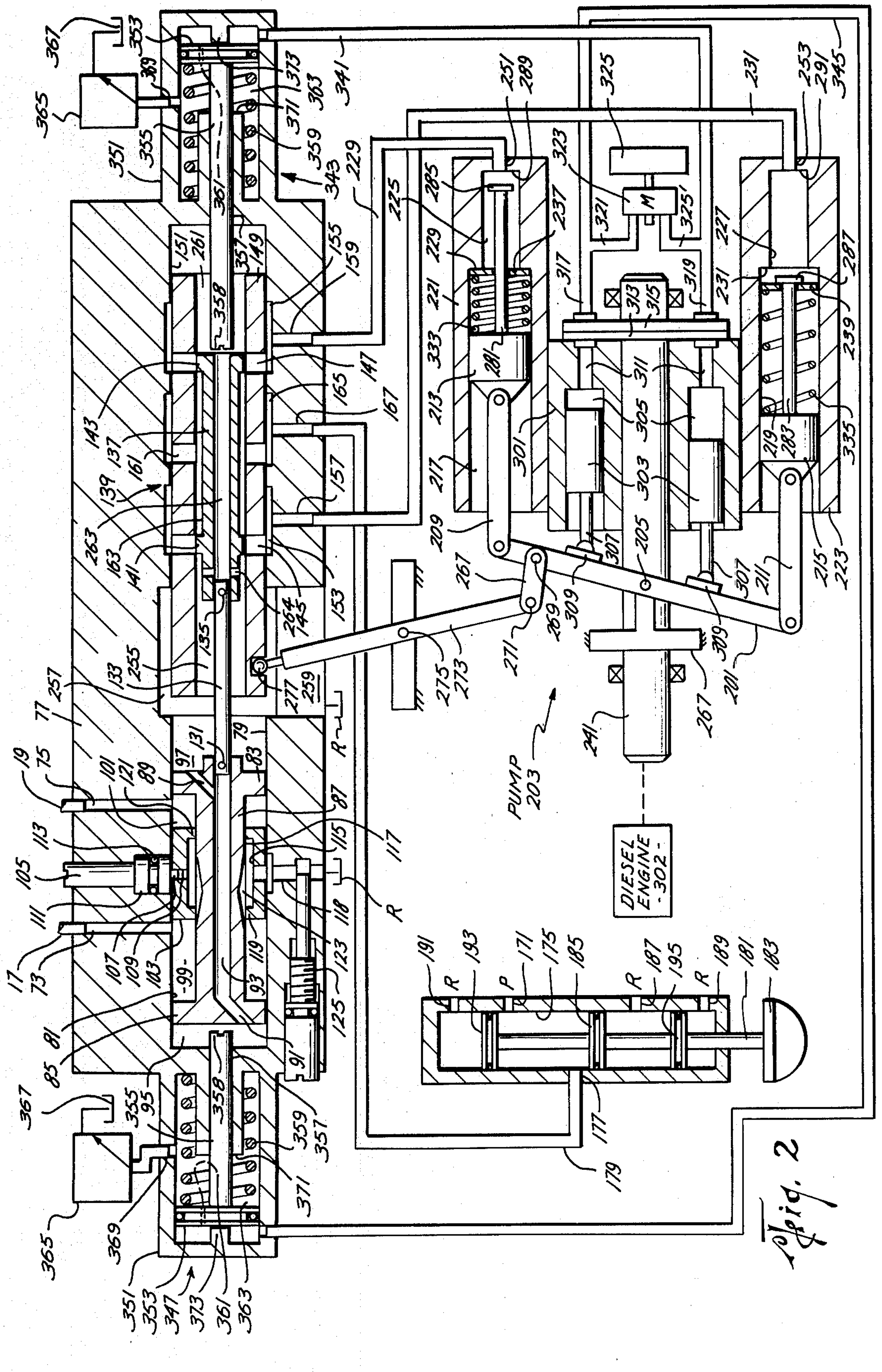

Referring now to FIG. 2, lines 17, 19 from the transmitter connect to passages 73, 75 in cylinder block 77. Within responder cylinder means, which includes coaxial cylinder bores 79, 81, moves responder piston means including pistons 83, 85, which are connected together by rod 87 to move in unison. Ports 89, 91 through the pistons connect interior passage 93 of the tube with spaces 95, 97 in bores 79, 81 at the ends of the responder cylinder means. Block passages 73, 75, connect to spaces 99, 101 in bores 95, 97, on the opposite sides of pistons 83, 85 from spaces 95, 97.

Cylindrical plug 103, which separates space 99 from space 101, is adjustably positioned in a continuation of bores 79, 81 by means of pin 105. Pin 105 has an eccentric tip 107 received in a socket 109 in the side of the plug. An eccentric cylindrical enlargement 111 on pin 105 carries an O-ring 113 in a groove thereabout to seal with a block passage in which pin 105 is received, such passage being correlative to the pin. Enlargement 111 prevents the pin from being pushed out by pressure inside block 77.

Tube 87 extends slidably through a central bore 115 in cylindrical plug 103, such bore having a larger inner diameter than the outer diameter of the tube, leaving annular space 117 therebetween. Radial passage 118 connects groove 117 with reservoir R. Inturned flanges 119, 121 at the ends of the plug fit closely about the tube and close the ends of the annular space. Annular groove 123, double tapered in cross section, extending around the middle of tube 87, has an axial length substantially equal to the distance between the ends of plug 103, i.e. between the outer faces of flanges 119, 121. Flanges 119, 121 and groove 123 form feedback valve means controlling flow of fluid from spaces 99, 101 to reservoir R according to the axial position of piston means 83, 85. Screw valve 125 provides manually adjustable means to control the rate of flow of fluid to reservoir R through passage 118 from spaces 99, 101 to balance the resistance of such feedback venting passage 118 with that of transmitter vent passage 55 combined with that of transmission lines 17, 19.

OPERATION OF TRANSMITTER AND RESPONDER

Pressure differential between lines 17, 19 created by the transmitter varying the venting of one or the other or both will create difference between the pressures in spaces 99, 101. Such pressure difference tends to move piston means 85, 87 to the left or to the right from the neutral position in which groove 123 lies wholly within plug 103. Movement of the piston means away from the neutral position, e.g. to the left as shown, opens up the higher pressured one of spaces 99, 101, i.e. space 99, in the case illustrated, to groove 123 and vents such higher pressure space through passage 118 to reservoir R. Due to the taper of groove 123, the amount of such venting depends on the axial extent of the displacement of the piston means. The venting increases as the piston means moves until the pressure difference is eliminated, at which point the piston means 85, 87 comes to rest.

Load Valve

Responder piston means 83, 85 is connected by pin 131 to piston rod 133, which in turn is connected by pin 135 to tubular spool 137 of load control valve 139. Spool 137 has two cylindrical lands 141, 143 which control flow through ports 145, 147 in variable position cylindrical valve seat sleeve 149. Sleeve 149 is axially slidable in bore 151 in cylinder block 77. Ports 145, 147 communicate with annular grooves 153, 155 in the side of bore 151. Grooves 153, 155 in turn communicate with passages 157, 159 in block 77. Further ports 161 in sleeve 149 communicate at their inner ends with annular space 163 between lands 141, 143 on valve spool 137, and at their outer ends with annular groove 165 in the side of bore 151. Groove 165 in turn communicates with passage 167 in block 77. Passages 157, 159 and 167 constitute the inlet and outlet means for load control spool valve 139.

Emergency Cut Off Valve

Pressure fluid (oil) is supplied from pump 11 (FIG. 1) via a fluid conduit (not shown) to port 171 in valve body 173 and passes through cylindrical bore 175 in body 173 and thence out through port 177 in the valve body to conduit 179. Conduit 179 connects to inlet passage 167 of load control spool valve 139.

In case of an emergency calling for discontinuance of supply of pressure fluid to valve 139, valve stem 181 connected to control knob 183 is moved axially from the position shown in FIG. 2 until flange 185 passes port 177. This cuts off port 177 from high pressure port 171 and places port 177 in communication through bore 175 with port 187 which connects to reservoir R.

Vent ports 189, 191 to reservoir R from the ends of valve body 173 prevent hydraulic locking of valve 173 should fluid leak past flanges 193, 195. Flanges 193, 195 are carried by valve stem 181 and close the ends of bore 175 and also serve as guide bearings. Flanges 193, 195 and also flange 185, are provided with suitable peripheral seal means such as O-rings, to seal with bore 175.

Swash Plate

Servo valve 139 controls the angular position of swash plate 201 of pump 203. Swash plate 201 is pivotally supported by pivots 205 for pivoting about a diameter of the swash plate, the pivots being carried by pivot support structure 207.

Swash plate 201 is pivotally connected to links 209, 211, which in turn are pivotally connected to pistons 213, 215 moving in cylinder bores 217, 219 in the bodies of servo motors 221, 223. Bores 217, 219 connect with smaller diameter counter bores 225, 227 forming shoulders 229, 231. Helical springs 333, 335 between pistons 213, 215 and end washers 237, 239 engageable with shoulders 229, 231 bias swash plate 205 to a neutral position perpendicular to the axis of pump shaft 241.

Ports 251, 253 in the ends of counter bores 225, 227 connect with fluid conduits 229, 231 from outlet ports 157, 159 of load control valve 139. When load control valve 139 is positioned to conduct pressure fluid to one or the other of servo motors 221, 223 it will also connect the other one of such motors to reservoir R.

For example, if land 141 is to the right of port 145, the latter is open through annular space 255 between spool 137 and sleeve 149 to chamber 257 at the left end of bore 151. Chamber 257 connects through slot 259 with reservoir R. In this regard it is to be noted that cylinder block 77 and pump 203 are disposed in a common casing, not shown, the lower part of which constitutes reservoir R, and slot 259 opens to the interior of the casing.

On the other hand, when land 143 is to the left of sleeve port 147, the latter is open to space 261 at the end of sleeve 149, which communicates via passage 263 and port 264 in tube 137 with space 255 which connects through slot 259 with reservoir R.

Connecting one of servomotors 221, 223 to pressure fluid and the other to the reservoir will tilt the swash plate. As shown, the swash plate has been tilted clockwise. Motion of the swash plate reacts on the load control valve via mechanical feedback means. Such mechanical feedback means comprises link 267 pivotally connected to the swash plate at 269 and at 271 to lever 273. Lever 273 is pivotally mounted at 275 and is pivotally connected at 277 to a socket in sleeve 140. As shown, the mechanical feedback means has moved sleeve 137 to the left with its ports 145, 147 in register with lands 141, 143 to cut off high pressure fluid from both servo motors 221, 223 and also to cut off both motors from reservoir R, thus locking the motors and the servo valve in the position shown.

Movement of the control valve to the right or the left will open up ports 145, 147, one to pressure fluid and the other to the reservoir, causing the swash plate to move until the mechanical feedback moves the control valve seat sleeve to close off ports 145, 147. Mechanical means to limit travel of the swash plate is provided by rods 281, 283 connected to pistons 213, 215 and provided with feet 285, 287 engageable with the ends 289, 291 of the servo motor bodies.

Pump

Pump 203 includes a cylinder block 301 secured to drive shaft 241 which is rotated, e.g. by a diesel engine 302. A plurality of pistons 303 axially slidable in bores 305 are pivotally connected by piston rods 307 to glide pads 309 bearing against swash plate 201. As cylinder block 301 is rotated, the piston rods move inwardly; the pistons in the cylinder bores that are nearest the swash plate (e.g. the uppermost ones as shown in FIG. 2) force hydraulic fluid out through the one of ports 311 associated therewith. Such fluid flows through fixed and rotating swivel plates 313, 315 to one of the power fluid transmission lines 317, 319, (line 317 in the FIG. 2 example). Such line thus becomes the high pressure fluid power line. Such line is connected to one side of hydraulic motor 323 by fluid conduit 321.

At the same time, lower pressure fluid is returned to the pump from motor 323 via fluid conduit 325' to fluid power line 319, which thus becomes the low pressure fluid power line. Fluid returning via line 319 pushes to the left those pump pistons 303 that are in the cylinder bores farthest from the swash plate.

Motor

Motor 323, though shown only schematically, is preferably a variable angle swash plate type motor similar to the pump, with a servo system to control the motor swash plate angle similar to that shown herein for the pump. Typically, as depicted in FIG. 4, the core of the motor control transmitter will be mounted on the same shaft as core 33 of the pump control transmitter so that both will be operated together. Since it is not desirable to move the motor swash plate to a zero angle, the ports of the motor control transmitter will be displaced azimuthally from ports 35, 37 of the pump control transmitter so that neither one of them will be opened until after the corresponding one of ports 35, 37 of the pump control transmitter has been partially or fully opened. Also, the two control transmission lines from the motor control transmitter, instead of leading to opposite sides of the responder as do lines 17, 19 of the pump control transmitter, will be connected together so as to lead to only one side of the responder. Therefore, the motor swash plate angle will never be reversed, reversal of motor direction being effected only by reversing the pump swash plate angle and hence of the direction of flow of fluid from the pump. See FIG. 1A wherein parts similar to parts of FIG. 1 are given like numbers, except primed, thereby avoiding the need of repeating the description.

Truck Driver

Figure 3:
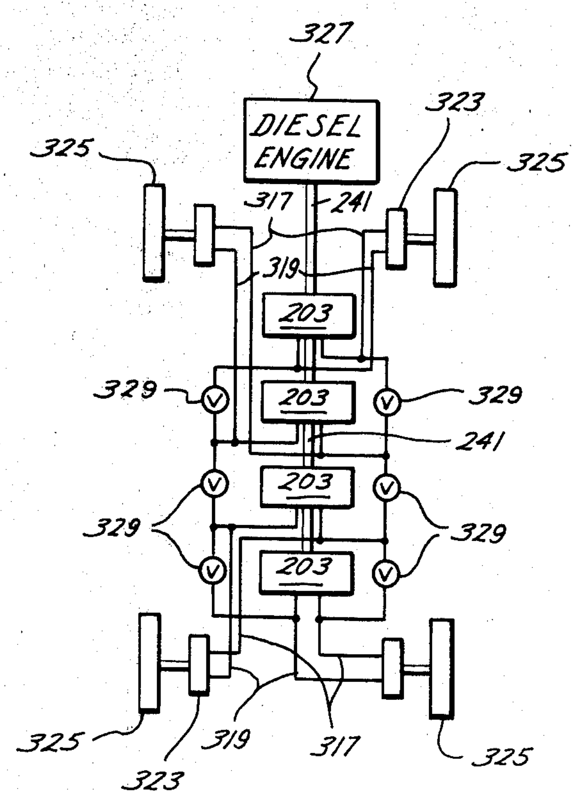
FIG. 3 is a schematic drawing showing a four wheel drive truck with which the system of FIGS. 1 and 2 may be employed in accordance with the invention.

In FIG. 2, motor 323 is shown to be connected to a particular load, namely, a wheel 325 of a truck. Referring to FIG. 3, four such motors 323 are shown as providing individual drive means for the four wheels 325 of a truck. Motors 323 are individually connected to four pumps 203 which are driven by common drive shaft 141 connected to diesel engine 327. To equalize the load on the four pump-motor sets, fluid conduits are provided, paralleling the power transmitting fluid conduits 317, 319. Flow restrictors 329 are provided in the paralleling conduits. Whenever one pump is loaded sufficiently to increase its pressure above that of the other pumps, fluid flows from such pump to the other motors, thereby relieving the pressure and equalizing the same. The flow restrictors prevent all the fluid from flowing to one motor should same become unloaded, e.g. by the wheel connected thereto skidding.

Horsepower Limiter

Referring once more to FIG. 2, whenever the load on a pump 203 increases, e.g. due to increased torque requirement of the connected motor, causing the pump pressure to increase, such pressure is communicated from the high pressure fluid power transmission line, e.g. line 317, by fluid conduit 345 to control valve travel limit means 347. Should the swash plate be tilted counterclockwise from the neutral position, oppositely from the direction shown, so as to make power transmission line 319 the high pressure line, as in the case of reversing the direction of motor 323, and should pressure in that line increase, such increased pressure will be transmitted via fluid conduit 341 to control valve travel limit means 343. Travel limit means 343, 347 are identical, so that only one need be described, and like parts are given like numbers.

Travel limit means 343, 347 each comprise a servo motor cylinder 351 within the cylindrical bore of which is axially slidably disposed piston 353 carrying a peripheral O-ring seal to seal with the cylinder bore. Piston rod 355 connected to piston 353 extends through aperture 357 in block 77, slotted end 358 of rod 355 providing a travel limit stop for control valve spool 137 on the one hand and responder piston means 83, 85, 87 on the other.

Normally, helical spring 359 coaxially disposed about rod 355 in motor cylinder 351 between piston 353 and block 373 urges piston 353 and rod 355 away from valve spool 137 on the one hand and away from responder piston 85 on the other. A small hole 361 in piston 353 normally keeps the fluid pressure on opposite sides of piston 353 equalized so that only the area of piston rod 355 is subject to differential pressures and this is insufficient to overcome the spring pressure.

However, if the pressure in line 341 or 345 should increase above a preset lower limit, the fluid pressure will overcome the spring, causing the piston and its rod to move toward control valve spool 137 or responder piston 85. The force will be sufficient to overcome any opposing force of the responder. According to the magnitude of the excess of pressure, spring 359 will be compressed to a greater or lesser degree. The spring force increases linearly with its compression, so that the position of travel limit stop 358 will vary in proportion to the pressure excess.

Travel limit stop 358, limiting the travel of valve spool 137 or responder piston 85, limits the angle at which swash plate 201 can be tilted, which in turn limits the rate of fluid flow from the pump. Since power is proportional to pump pressure times rate of fluid flow, it will be seen that there has been provided pressure responsive means to limit rate of fluid flow and hence to limit power output of the pump. By varying the spring modulus of spring 359, the power limit can be varied to fit the diesel engine driving the pump.

Pressure Limiter

If pressure in line 341 or 345, and hence in chamber 363 in motor cylinder 351 on the opposite side of piston 353 from line 341, should increase above a preset upper limit, relief valve 365 will open and dump the hydraulic fluid to a reservoir 367. If as may or may not be selected, the same hydraulic system is used for the pump-motor set as for the transmitter-responder system and for the load control servo valve, reservoir 367 will be the same as reservoir R to which reference has previously been made. Upon rapid dumping of fluid from chamber 363 through valve 365, a rate faster than entrance of fluid through small hole 361, there will be created a pressure differential across the whole area of piston 353, causing the piston and its rod to move toward control valve spool 137 or responder piston 85. Before piston 353 passes port 369 leading from chamber 363 to valve 365, piston 353 will engage stop sleeve 371. When the pressure in line 341 falls to normal, spring 359 will push piston 353 back against stop abutment 373.

When the piston rod is at the extreme end of its travel as determined by stop sleeve 371, spool 137 of spool valve 139 will be moved so far to the left or the right that seal sleeve port 147 or 145 will be open to the reservoir and seal sleeve port 161 will be open to pressure fluid from port 167 no matter where the seal sleeve 149 is positioned, thereby bringing the swash plate back to untilted neutral position.

Although a typical pump-motor system will include a swashplate motor, in some cases the motor might be some other form of rotating motor, and could even be a reciprocating motor, and might act only intermittently instead of running continuously; for example, the motor might simply be a hydraulic cylinder comprising a cylinder with a piston in it to actuate a load.

The system acts to limit power load on the pump and/or motor; it also acts to relieve excess pressure in the sense of limiting such pressure rather than venting fluid from the line.

Also, the pressure limiter may not always return the swashplate angle to zero; when pressure in excess of the preset limit occurs, the pressure limiter moves the swashplate to reduce swashplate angle until the pressure drops below the preset limit, which may not require moving the plate all the way to zero angle, and in some cases may require moving the plate past center i.e. through zero angle, reversing the flow, in order to reduce the pressure.

While a preferred embodiment of the invention has been shown and described, modifications thereof can be made by one skilled in the art without departing from the spirit of the invention.

I claim:

1. In combination with a pump-motor hydraulic power transmission system including a pump, a motor, and two hydraulic fluid transmission lines interconnecting the pump and motor, at least one of said pump and motor having a variable angle swash-plate, servo motor means to vary the angle of said swash plate, control valve means for controlling the servo means, said control valve means including a three-way valve for alternate connection of one side of said servo-motor means to a source of fluid pressure and a reservoir, and operator means for positioning the control valve means;

travel limit means at each opposite end of said three-way valve positionable in the path of travel of said three-way valve for abutment therewith and motor means associated with each respective travel limit means and responsive to the pressure in the higher pressure one of said transmission lines to adjust the position of a said respective travel limit means, a spring means biasing each of said motor means to a position where said travel limit means is disengaged from said three-way valve, said travel limit means being movable between (1) a normal position disengaged from said three-way valve, (2) positions in the path of travel of said three-way valve but out of contact therewith, and (3) positions in abutting engagement with said three-way valve and determining the position of the three-way valve.

2. In combination with a pump-motor hydraulic power transmission system including a pump, a motor, and two hydraulic fluid transmission lines interconnecting the pump and motor, at least one of said pump and motor having a variable angle swash-plate, servo motor means to vary the angle of said swash plate, control valve means for controlling the servo motor means, said control valve means including a three-way valve for alternate connection of one side of said servo motor means to a source of fluid pressure and a reservoir and operator means for positioning the control valve means;

a power limit means for restricting the power transmitted from the pump to the motor comprising:

travel limit means at each end of said three-way valve that is adjustably positionable for limiting the travel of said three-way valve by abutment therewith, and motor means at each opposite end and associated with a respective travel limit means, said motor means being responsive to the pressure in the higher pressured one of said transmission lines to adjust the position of said travel limit means, said motor means including a cylinder, and a piston movable in the cylinder, said travel limit means being connected to said piston, said one transmission line being connected to said cylinder at one side of said piston to create a fluid pressure thereon urging the piston in a direction to place said travel limit means in a position to limit control valve movement, and spring means urging said piston in the opposite direction from said fluid pressure disengaging said travel limit means from said three-way valve, said three-way valve including a seat member having openings for passage of fluid between said servo motor and said source and reservoir and a closure member for controlling flow through said openings, said operator means and said travel limit means both being associated with the same one of said members, and feedback means connecting the swash plate to the other of said members.

3. In combination with a pump-motor hydraulic power transmission system including a pump, a motor, and two hydraulic fluid transmission lines interconnecting the pump and motor, at least one of said pump and motor having a variable angle swash-plate, servo motor means to vary the angle of said swash plate, control valve means for controlling the servo motor means, said control valve means including a three way valve for alternate connection of one side of said servo motor means to a source of fluid pressure and a reservoir and operator means for positioning the control valve means;

a power limit means for restricting the power transmitted from the pump to the motor comprising:

travel limit means that is adjustably positionable for limiting the travel of said three-way valve by abutment therewith and motor means responsive to the pressure in the high pressured one of said transmission lines to adjust the position of said travel limit means, said motor means including a cylinder, and a piston movable in the cylinder, said travel limit means being connected to said piston, said one transmission line being connected to said cylinder at one side of said piston to create a fluid pressure thereon urging the piston in a direction to place said travel limit means in a position to limit control valve movement, and springs means urging said piston in the opposite direction from said fluid pressure disengaging said travel limit means from said three-way valve, said motor means further including a pressure relief valve means connected to said cylinder on the spring side of said piston, a restricted flow passage from said spring side of the piston to the other side thereof, said restricted flow passage having a higher resistance to fluid flow from said other side of said piston to said spring side of said piston than the resistance for flow from said spring side of said piston through said pressure relief valve when the latter is open.

4. Apparatus according to claim 3, said motor means further including first stop means preventing movement of said piston past the point of connection of said relief valve means to said cylinder and second stop means preventing movement of said piston past the point of connection of said transmission line to said cylinder.

5. Apparatus according to claim 4, said relief valve means comprising an adjustably loaded safety valve, and fluid passage means connecting the inlet of said safety valve to said cylinder and the outlet of said safety valve to a fluid reservoir.

6. In combination with a pump-motor hydraulic system including a pump, a motor, and two hydraulic fluid transmission lines interconnecting the pump and motor, at least one of said pump and motor having a variable angle swash-plate, servo motor means to vary the angle of said swash plate, control valve means for including a three-way valve for alternate connection of one side of said servo motor means to a source of fluid pressure and a reservoir and operator means for positioning the control valve means;

a power limit means for restricting the power transmitted from the pump to the motor comprising:

travel limit means that is adjustably positionable for limiting the travel of said three-way valve by abutment therewith and motor means responsive to the pressure in the higher pressured one of said transmission lines to adjust the position of said travel limit means, said travel limit means including a first stop means disengaged from said three-way valve when the pressure in one of said lines is below a set value for limiting travel of the three-way valve in one direction and a second stop means disengaged from said three-way valve when the pressure in the other of said lines is below a set value for limiting travel of the three-way valve in the opposite direction, said motor means including a first motive means responsive to the pressure in one of said transmission lines and biased by a first spring means disengaging said first stop means from said three-way valve to adjust the position of the first stop means and a second motive means responsive to the pressure in the other of said transmission lines and biased by a second spring means disengaging said second spring stop means from said three-way valve to adjust the position of the second stop means.

7. Apparatus according to claim 3, said control valve means including a source of fluid under pressure, a reservoir, and valve apparatus for alternately connecting said source of fluid under pressure and said reservoir to said servo motor means, said source of fluid under pressure including first conduit means connectable to a pump and second conduit means connected to said valve apparatus, and emergency shut down means between said conduit means, said emergency shut down means comprising a valve manually positionable to provide a fluid path between said conduit means and manually positionable to block such fluid path and connect said second conduit means to a reservoir.

8. In combination with a pump-motor hydrualic power transmission system including a pump, a motor, and two hydraulic fluid transmission lines interconnecting the pump and motor, at least one of said pump and motor having a variable angle swash-plate, servo motor means to vary the angle of said swash plate, control valve means for controlling the servo motor means, said control valve means including a three way valve for alternate connection of one side of said servo motor means to a source of fluid pressure and a reservoir, and operator means for positioning the control valve means;

a power limit means for restricting the power transmitted from the pump to the motor comprising:

travel limit means at each opposite end of said three-way valve that is adjustably positionable for limiting the travel of said three-way valve by abutment therewith, and motor means at each said opposite end and associated with a respective travel limit means, each said motor means being biased by a spring out of engagement with said three-way valve and being responsive to the pressure in the higher pressured one of said transmission lines to adjust the position of said travel limit means, said operator means including a fluid transmission conduit means, means to supply pressure fluid to said conduit means, transmitter means to variably vent said conduit means, and responder means responsive to changes in pressure of said conduit means to move a portion of the responder means, said portion being connected to said three way valve, said travel means being associated with the same movable part of said three way valve means as said responder means and overriding said responder means in determining the position of said three way valve.

9. Apparatus according to claim 8, said transmitter means including first manually positionable, adjustable, rotatable valve means adjustable between full open and full closed position by valve motion of less than 360 degrees for rapid actuation, and second manually positionable, adjustable, rotatable valve means in parallel with said first valve means requiring a valve motion of more than 360 degrees for adjustment over the full range between full open and full closed positions, providing for a fine degree of control.

10. Apparatus according to claim 9, said first manually positionable, adjustable, rotatable valve means requiring less than ninety degrees rotation for adjustment over its full range, said second manually positionable, adjustable, rotatable valve means requiring a plurality of revolutions for adjustment over its full range.

11. Apparatus according to claim 10 including on-off valve means in series with said second manually positionable, adjustable, rotatable valve means.

12. Apparatus according to claim 9, said first and second manually positionable, adjustable, rotatable valve means being in parallel.

13. Apparatus according to claim 9, said conduit means including two conduits interconnecting said transmitter means and responder means, said second manually positionable, adjustable, rotatable valve means including one valve means controlling venting of one said conduits and another valve means controlling venting of the other of said conduits.

14. Apparatus according to claim 8, the other of said pump and motor having a second variable angle swash plate and including second servo motor means to vary the angle of said second swash plate, second control valve means for controlling the second servo motor means, and second operator means for positioning the second control valve means, said second operator means including:

a second fluid transmission conduit means, means to supply pressure fluid to said second conduit means, second transmitter means to variably vent said conduit means, and second responder means responsive to change in pressure of said second conduit means to move a portion of said second responder means, the last said portion being connected to said second control valve means, and coordination means interconnecting said first and second transmitter means to cause simultaneous movement thereof.

15. Apparatus according to claim 14, said first and second transmitter means asynchronously coming into play as said coordination means is moved, whereby first the pump swash plate angle is varied and last the motor swash plate angle is varied as said coordination means is moved.

16. Apparatus according to claim 15, said transmitter means being rotary throttle valves, said coordination means being a shaft interconnecting said valves.

17. Apparatus according to claim 16, there being two flow lines included in said fluid transmission conduit means connecting the first said transmitter and responder, said pump swash plate's angle being varied by the servo motor means controlled by the control valve means connected to said portion of said first said responder, said first said transmitter venting first one and then the other of said fluid lines to vary the angle of said pump swash plate through a position of zero angle of tilt from a certain angle of tilt in one direction to a certain angle tilt in the opposite direction, there being a single line connecting the other transmitter and responder, the second transmitter variably venting said single line while the first said transmitter variably vents first one and then the other of said two flow lines but without ever positioning the motor swash plate at zero angle of tilt.

18. Apparatus according to claim 17, said coordination means causing said motor swash plate to begin to tilt at a position at which said pump swash plate is less than fully tilted.

19. In combination with a pump-motor hydraulic power transmission system including a pump, a motor, and two hydraulic fluid transmission lines interconnecting the pump and motor having a variable angle swashplate, servo motor means to vary the angle of said swash plate, control valve means for controlling the servo motor means, said control valve means including a three-way valve for alternate connection of one side of said servo motor means to a source of fluid pressure and a reservoir and operator means for positioning the control valve means;

a power limit means for restricting the power transmitted from the pump to the motor comprising:

travel limit means at at least one end of said three-way valve that is adjustably positionable for limiting the travel of said three-way valve by abutment therewith and motor means at said at least one end of said three-way valve and associated with said travel limit means, said motor means being biased by a spring out of engagement with said three-way valve and being responsive to the pressure in one of said transmission lines to adjust the position of said travel limit means, said operator means including:

a fluid transmission conduit means, means to supply pressure fluid to said conduit means, transmitter means to variably vent said conduit means, and responder means responsive to changes in pressure of said conduit means to move a portion of the responder means, said portion being connected to said three-way valve, said travel limit means being connected to the same movable part of said three-way valve means as said responder means and overriding said responder means in determining the position of said three-way valve, said travel limit means being movable between (1) a normal position disengaged from said three-way valve, (2) positions in the path of travel of said three-way valve but out of contact therewith, and (3) positions in abutting engagement with said three-way valve and determining the position of the three-way valve.

20. Apparatus according to claim 19, said three-way valve including a seat member having openings for passage of fluid between said servo motor means and said source and reservoir and a closure member for controlling flow through said openings, said operator means and said travel limit means both being connected to the same one of said members, and feedback means connecting the swash plate to the other of said members.

* * * * *

UNITED STATES PATENT AND TRADEMARK OFFICE

CERTIFICATE OF CORRECTION

PATENT NO. : 4,355,506

DATED : October 26, 1982

INVENTOR(S) : Willie B. Leonard

It is certified that error appears in the above—identified patent and that said Letters Patent is hereby corrected as shown below:

Column 1, line 62; after "4,094,229."

Insert -- See for example catalogue 625 of Moog, Inc. Controls Division, Pioneer Airport, Aurora, N. Y., entitled Moog Electric Controller for Sundstrand Hydrostatic Drive (esp. pages 7-10). More information on the Sundstrand drive appears in Engineering Applications Manual, Sundstrand Hydro Transmission (Bulletin 9565 Rev. A) especially pages 22-27 and 52-55. --

Column 2, line 35; after "motor." insert --See also Bulletin 9.000.1 of Hydreco R Division of the New York Air Brake Company, Kalamazoo, Michigan, entitled Dynapower R Hydrostatic Transmission Systems from Hydreco, and document 9-0002 13A of Hydreco R a unit of General Signal Corporation, entitled Application Engineering Manual for Dynapower R page 38, Transmission Systems, especially.

UNITED STATES PATENT AND TRADEMARK OFFICE

CERTIFICATE OF CORRECTION

PATENT NO. : 4,355,506

DATED : October 26, 1982

INVENTOR(S) : Willie B. Leonard

It is certified that error appears in the above—identified patent and that said Letters Patent is hereby corrected as shown below:

Column 3, line 53; delete "as" and insert -- are --.

Column 7, line 37; change "driver" to -- drive --.

Signed and Sealed this

*Fifteenth* Day of *March 1983*

[SEAL]

*Attest:*

GERALD J. MOSSINGHOFF

*Attesting Officer* *Commissioner of Patents and Trademarks*